United States Patent [19]

Swanson et al.

[11] 4,292,734

[45] Oct. 6, 1981

[54] COMMONLY ACTUATED IN-LINE ASSEMBLY MACHINE

[75] Inventors: Douglas L. Swanson, McKean, Pa.; Norman H. Yeo, Georgetown, Mass.

[73] Assignee: Swanson-Erie Corporation, Erie, Pa.

[21] Appl. No.: 42,306

[22] Filed: May 25, 1979

[51] Int. Cl.³ .................. B23P 19/00; B23Q 7/03
[52] U.S. Cl. ........................... 29/791; 29/799; 29/823
[58] Field of Search .............. 29/33 K, 33 P, 428, 29/563, 564.1, 742, 791, 799, 823

[56] References Cited

U.S. PATENT DOCUMENTS

| | | | |
|---|---|---|---|
| 2,887,209 | 5/1959 | Merchant | 29/568 X |
| 2,990,940 | 7/1961 | Merchant | 198/793 |
| 3,065,530 | 11/1962 | Merchant et al. | 29/428 |
| 4,184,236 | 1/1980 | Nutt | 29/564.1 X |

OTHER PUBLICATIONS

"Precision In-Line Machine Chassis", Swanson-Erie Corp. Brochure.
"Swanson-Erie Automatic Assembly Machines", Swanson-Erie Corp. Advertisement.
"Swanson-Erie Linear Automatic Assembly Machines", Swanson-Erie Corp. Advertisement.
"The Bodine Model 64 Modular In-Line Assembly Machine", Bodine Corp. Brochure.

*Primary Examiner*—Ervin M. Combs
*Attorney, Agent, or Firm*—Hume, Clement, Brinks, Willian & Olds, Ltd.

[57] ABSTRACT

An in-line assembly machine is disclosed which is capable of commonly actuating tooling associated with the machine at a plurality of work stations. The machine includes a camshaft with a plurality of cams fixed thereto. Upper and lower elongated tool plates are also included. These elongated tool plates are reciprocated by first and second lifting rods, respectively, which are driven by the cams via followers. The rotation of the camshaft thus causes the upper and lower elongated tool plates to reciprocate, thereby commonly actuating tooling to perform operations on parts to be assembled.

11 Claims, 6 Drawing Figures

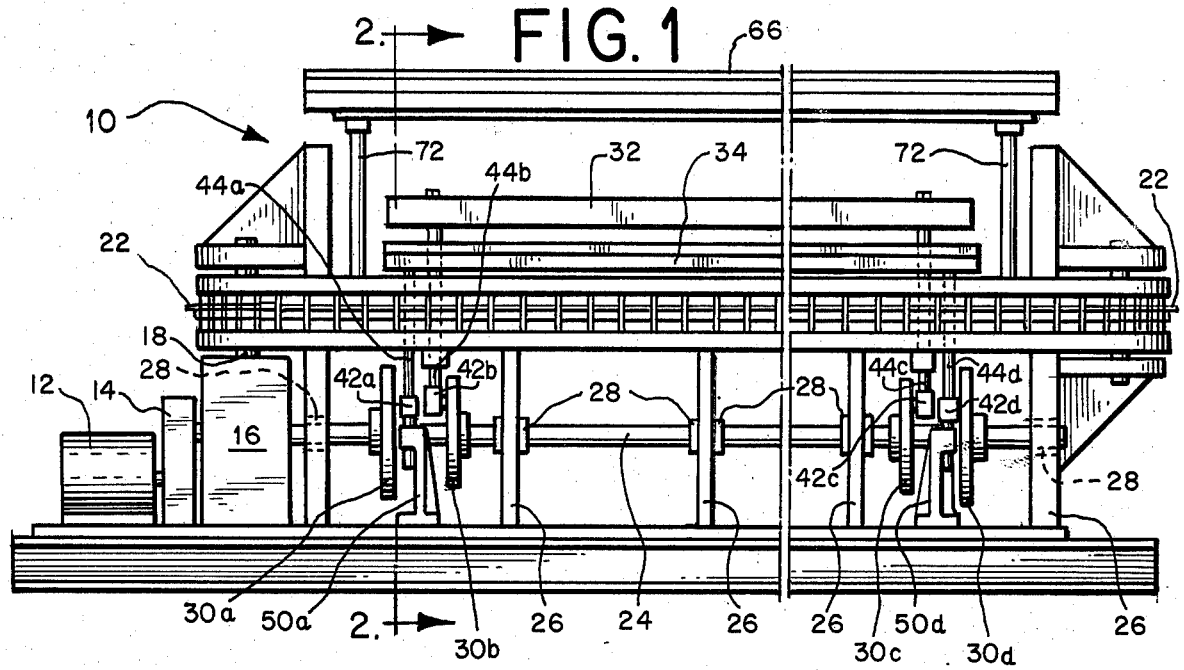
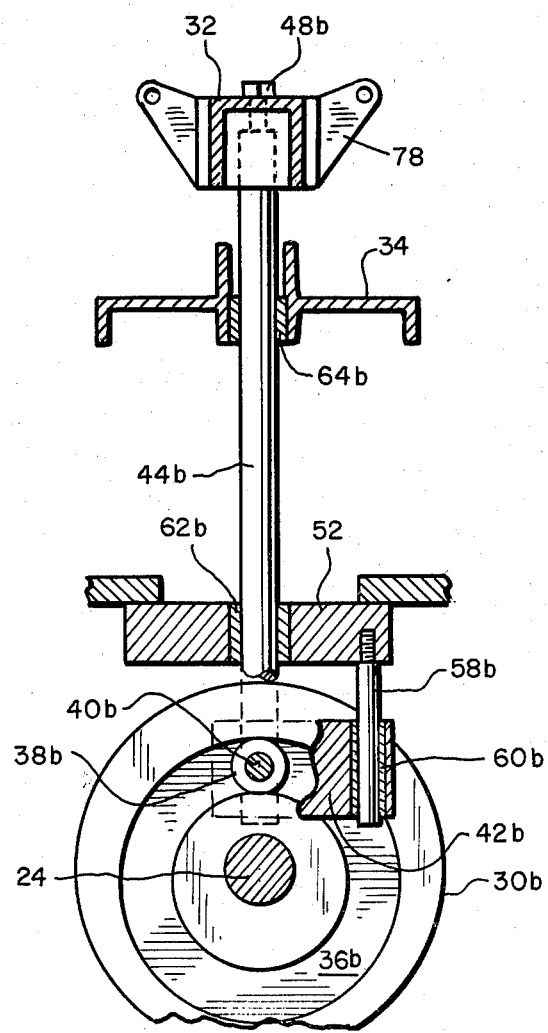

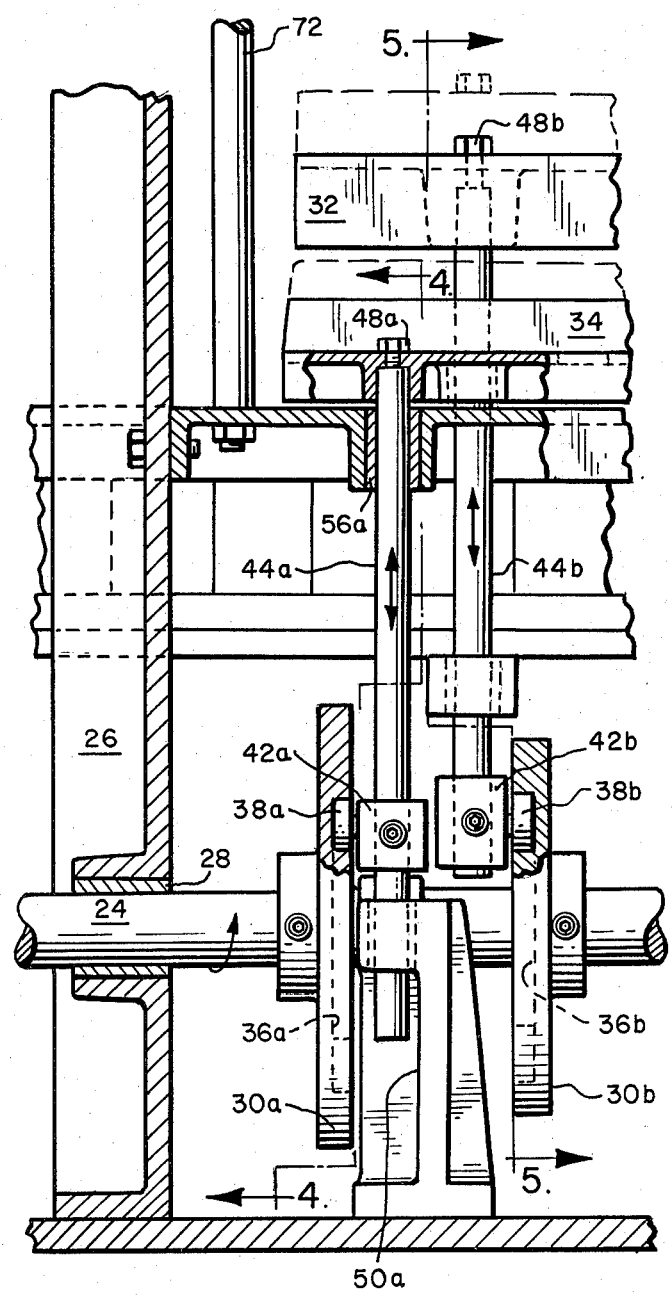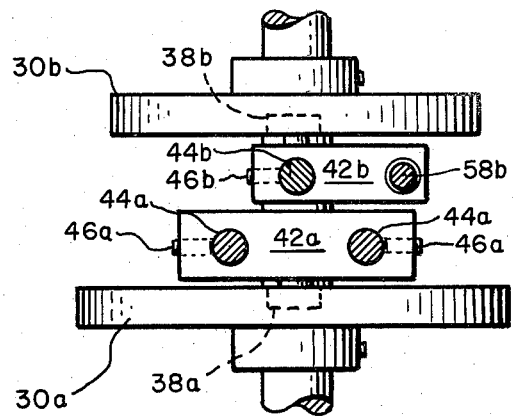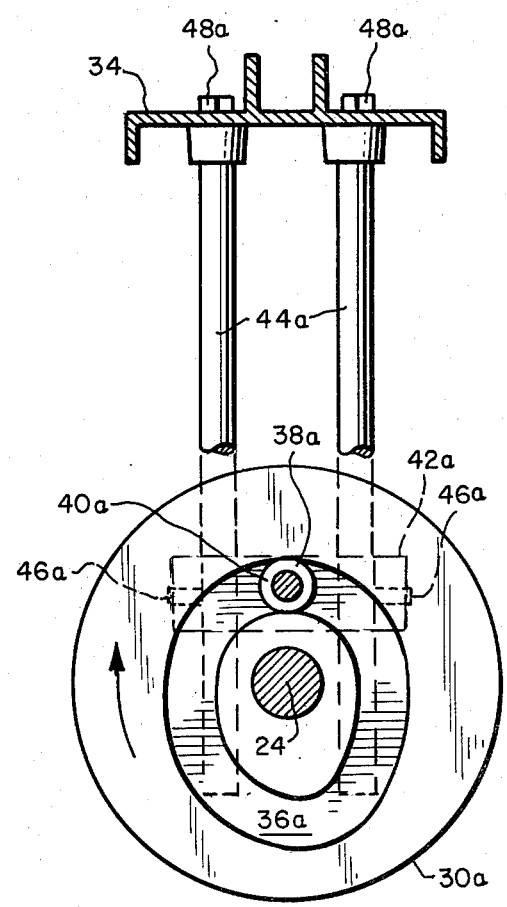

COMMONLY ACTUATED IN-LINE ASSEMBLY MACHINE

BACKGROUND OF THE INVENTION

This invention relates generally to in-line assembly machines. More particularly, the invention relates to an in-line assembly machine which is capable of commonly actuating tooling associated with the machine at a plurality of work stations.

Automated assembly machines have the capability of rapidly assembling a wide variety of component parts. For example, light bulbs, electrical components, disposable cigarette lighters and small pumps and motors are often assembled by such machines.

Most conventional assembly machines are generally of two basic designs. The first type, commonly called the rotary assembly machine, is described in U.S. Pat. No. 3,065,530 which is assigned to the Swanson-Erie Corporation. One of the most advanced machines of this type includes two circular tool plates designed to reciprocate above an intermittently-rotating circular indexing turret. A number of work stations are positioned around the periphery of the turret, a separate article being assembled at each such station.

The reciprocation of the tool plates causes actuation of tooling mounted to these plates, thus performing a wide variety of operations at the work stations, such as, screwing, riveting, punching or merely sensing the proper position of the parts at the stations. As explained in detail in U.S. Pat. No. 3,065,530, the use of two reciprocating tool plates enables the performance of more complex operations with greater adaptability than possible with machines having only a single tool plate.

Perhaps the single biggest reason for the success of the rotary assembly machine is its versatility. However, one of its limitations is that when a large number of operations are required to assemble an item, several rotary machines may have to be combined. In order to overcome the necessity of using several assembly machines, a so-called in-line type assembly machine is often utilized. This machine, which comprises the second basic type of assembly machine, typically includes a continuous, linked or articulated belt which intermittently indexes the article to be assembled through the required number of work stations. These work stations are ordinarily lined up on one or both sides of the machine, and occassionally on one or both ends.

The tooling at each work station is typically actuated by one or more cams mounted to lower and upper horizontal camshafts. When a simple operation is performed, such as merely sensing the position of the parts at the work station, it may be possible to use a single cam, which would ordinarily be mounted to one of the camshafts. However, when other more complex operations are required, such as those involving two motions, one or more additional cams are used.

For example, typical pick-and-place operations often involve outward/inward lateral motion as well as up/down vertical motion. The pickup cartridge is normally carried by the tooling associated with one of the cams, and therefore is caused to vertically reciprocate upon the rotation of this cam. The cartridge is raised or lowered to the proper elevation by the first cam and associated linkage. At the same time, the cartridge is driven laterally through the tooling associated with another of the cams. Thus, after picking up the part to be assembled, the cartridge is displaced laterally inward toward the work station by the second cam. This type of operation is exceedingly difficult with a single cam.

Since each work station therefore requires at least one and typically two or three of its own tooling actuating cams mounted to one of two separate camshafts, the complexity and thus the cost of such a machine is formidable. Another disadvantage of the complex tooling drive mechanisms required with conventional in-line machines is that the tooling and follower mechanisms are ordinarily not interchangeable between rotary and in-line assembly machines.

In order to eliminate some of the cams required with in-line machines, a so-called rise and fall bar has occasionally been utilized. This bar runs the length of the machine, on one or both sides, and provides tooling drive for performing simple operations such as sensing or stripping, often in cooperation with individual work station cams. However, upper and lower camshafts are still required in order to provide tooling actuating drive for the other work stations where more complex operations are being performed.

Accordingly, it is an object of this invention to provide an improved in-line assembly machine which eliminates the need for two camshafts with separate tooling drive mechanisms for each work station. Another objective is the provision of an improved in-line assembly machine in which the tooling is interchangeable with tooling used on rotary assembly machines. Yet another objective is the provision of an in-line assembly machine which is simpler and therefore less expensive and more reliable than conventional designs. Other objectives will become apparent as this description proceeds.

SUMMARY OF THE INVENTION

This invention responds to the problems set forth above by providing an in-line assembly machine which is capable of commonly actuating a wide variety of tooling used with the machine at a plurality of work stations. The machine includes a camshaft, a plurality of cams fixed to the camshaft, and upper and lower elongated tool plates. The upper and lower elongated tool plates are adapted to move in regular paths and thereby actuate tooling which may be mounted to the tool plates and/or to other portions of the machine. The so-called regular path is typically a vertical reciprocation motion, although the invention is not limited to this particular pattern of motion.

Also included are following means which comprise first and second lifting means mounted to operate the upper and lower elongated tool plates, respectively. The lifting means ordinarily comprise a plurality of rods, but again, the invention is not so limited. Cam followers are typically mounted to the lifting rod ends which are adjacent the cams, but separate cam followers may not be necessary with some lifting means.

The described following means translate rotation of the camshaft into repetitive motion, normally reciprocation, of the upper and lower tool plates, thereby commonly actuating tooling which is mounted on either of the tool plates, other regularly moving plates or surfaces, or mounted on fixed machine surfaces. This enables the performance of a wide variety of operations on the parts to be assembled.

DETAILED DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of an exemplary embodiment of the invention;

FIG. 3 is a fragmentary sectional elevation view taken along line 3—3 of FIG. 2;

FIG. 4 is a fragmentary sectional elevation view taken along line 4—4 of FIG. 3;

FIG. 5 is a fragmentary sectional elevation view taken along line 5—5 of FIG. 3; and FIG. 6 is a fragmentary sectional elevation view taken along line 6—6 of FIG. 2.

DETAILED DESCRIPTION OF THE PREFERRED EMBODIMENT

Figure 2:
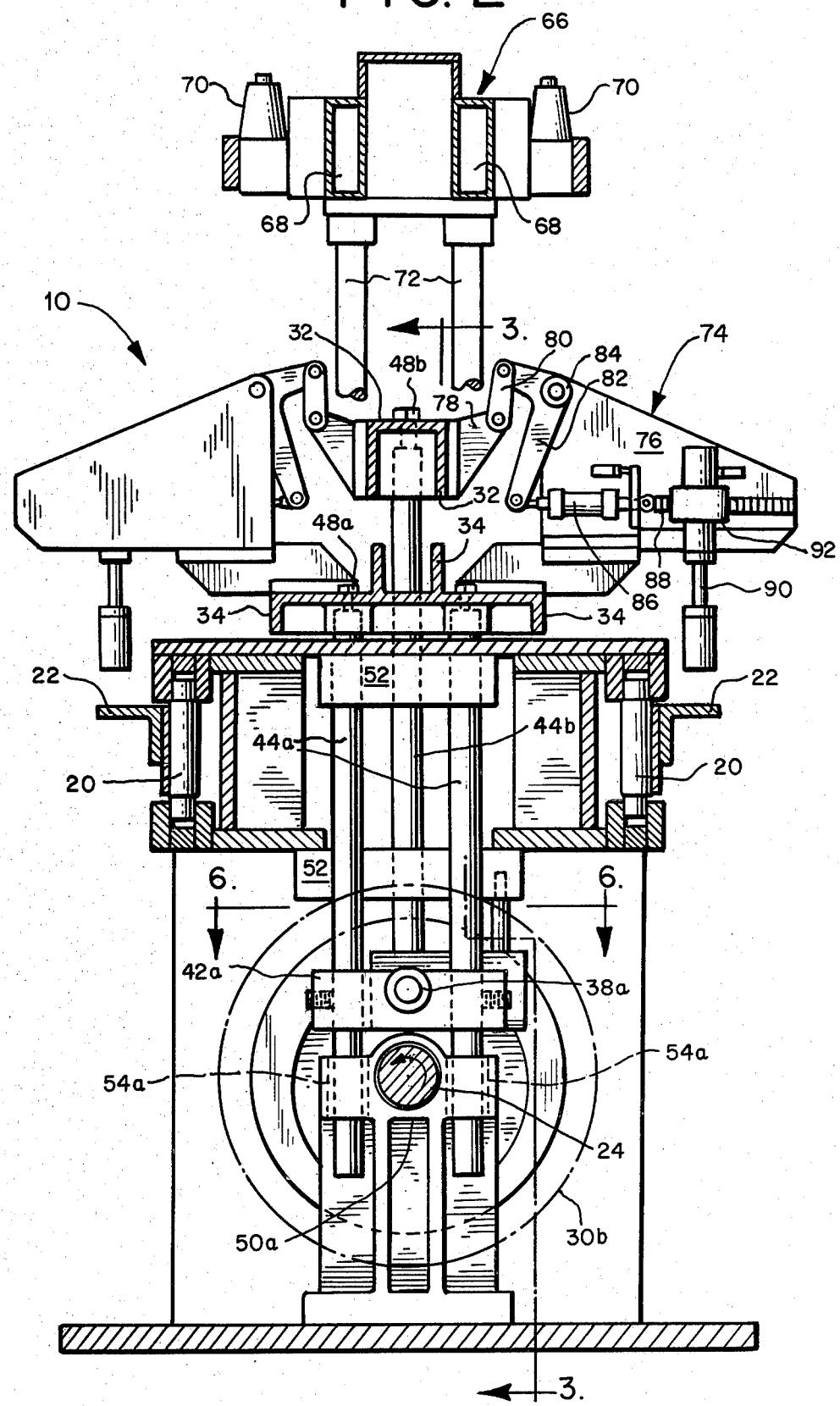
FIG. 2 is a sectional elevation view taken along line 2—2 of FIG. 1, with the addition of exemplary tooling which may be used with the invention.

In that form of the invention chosen for purposes of illustration in the drawings, an in-line assembly machine is identified generally by the numeral 10. The depicted assembly machine 10 is simplified for clarity and convenience and so that proper emphasis can be placed on the features which comprise the present invention. The details of the simplified and deleted portions are within the knowledge of those in the art.

As shown best in FIG. 1, power is provided by a motor 12 through reduction gears 14 or their equivalent. A conventional indexing drive unit 16 intermittently rotates the indexing drive shaft 18. The indexing drive shaft 18 in turn drives the linked drive belt 20 which consists of a plurality of pallets 22. The pallets 22 are, of course, designed to hold the article which is to be assembled.

The camshaft 24 is also driven by the motor 12 via the reduction gear 14. The camshaft 24 extends the length of the machine 10 through the samsons 26, and is rotatably supported by bearings 28 within the samsons 26.

The depicted assembly machine 10 includes four cams 30a, 30b, 30c and 30d, left to right as shown in FIG. 1, fixed to the camshaft 24. These cams 30a-d, via appropriate following means, drive the upper and lower elongated tool plates 32 and 34 which are designed to commonly actuate tooling at a plurality of work stations. The assembly machine depicted in FIG. 1 is broken to indicate that it might be substantially longer than the depicted portion. If it is substantially longer than the portion shown, additional cams may be required.

FIGS. 2-6 depict cams 30a and 30b and associated following means. Additional figures have not been used to show cams 30c and 30d and associated following means because these cams are the mirror image of cams 30a and 30b.

The designation 30a-d has been used for the cams because, with the exception of the cam groove configuration to be discussed below, the four cams are basically similar in design. The letters a-d will also be used with other numerals throughout the remainder of this detailed description to designate other corresponding parts associated with the cams 30a-d.

Each cam 30a-d includes a lateral groove 36a, 36b, 36c or 36d. However, it should be appreciated that other cam designs such as constrained or open-faced may alternatively be used. The general design of groove 36a is dipicted in FIG. 4, and the general design of groove 36b is depicted in FIG. 5. As mentioned above, cams 30d and 30c correspond and are the mirror image of cams 30a and 30b, respectively and associated following means.

A roller-type follower 38a, 38b, 38c or 38d fits into each of the grooves as the cams 30a-d are rotated by the camshaft 24. Each follower 38a-d is rotatably mounted to a pin 40a, 40b, 40c or 40d which, in turn, is fastened to a tie bar 42a, 42b, 42c or 42d.

The two outer or distal tie bars 42a and 42d are each fixed to two lower tool plate lifting rods 44a or 44d, which pass through the tie bars 42a or 42d. This design is best shown in FIG. 4. Dowel screws 46a or 46d secure the templates to the lower tool plate lifting rods 44a or 44d. The upper ends of the lower tool plate lifting rods 44a and 44d terminate at and are affixed to the lower elongated tool plate 34 by bolts 48a or 48d.

The lower tool plate lifting rods 44a and 44d are thus designed to reciprocate as the camshaft 24 rotates. The lower tool plate lifting rods 44a and 44d are prevented from rotating by bifurcated pillow blocks 50a or 50d adjacent their lower ends, and a linear frame 52 adjacent their upper ends. Both the pillow blocks 50a and 50d and the linear frame 52 are, of course, stationary, and include bushings 54a and 54d, and 56a and 56d, respectively, which permit reciprocation with a minimum amount of lateral displacement.

The two medial or inner tie bars 42b and 42c are each fixed to a single upper tool plate lifting rod 44b or 44c as shown best in FIG. 5. Dowel screws 46b or 46c securely fasten the tie bars 42b and 42c in place on the upper tool plate lifting rod 44b or 44c. The upper ends of the upper tool plate lifting rods 44b and 44c ordinarily terminate at and are affixed to the upper elongated tool plate 32 by bolts 48b or 48c. Alternatively these upper tool plate lifting rods 44b and 44c may extend upwardly to facilitate the use of additional mounting bushings (not shown).

The upper tool plate lifting rods are therefore designed to reciprocate in a manner similar to the lower tool plate lifting rods 44a and 44d. Rotation of the medial tie bars 42b and 42c is prevented by guide pins 58b or 58c, respectively, shown best in FIG. 5. These guide pins 58b and 58c are anchored in the linear frame 52. Guide pin bushings 60b or 60c within the medial tie bars 42b and 42c insure smooth reciprocation of the tie bars with respect to the guide pins 58b and 58c.

The upper tool plate lifting rods 44b and 44c pass through apertures in the linear frame 52 and the lower elongated tool plate 34, both of which are fitted with bushings 62b or 62c, and 64b or 64c, respectively. These bushings freely permit reciprocation but minimize lateral displacement of the upper tool plate lifting rods 44b and 44c.

The assembly machine 10 depicted in FIG. 2 also includes an overhead structure 66. This overhead structure 66 is of conventional design, and includes service provisions including air manifolds 68 and control valves 70 designed to direct air to the assembly machine 10 as needed, to provide electrical raceways (not shown), to support hydraulic piping (not shown) and to provide additional service needs. The overhead structure 66 is typically supported by stationary support columns 72 which extend from the linear frame 52.

FIG. 2 depicts typical tooling 74 which may be used with the assembly machine 10. Such tooling 74 is of conventional design heretofore common with rotary assembly machines. Of course, the depicted tooling is purely exemplary to show the type of operation which might be performed by the machine 10 at a particular work station.

The tooling 74 is mounted to a support plate 76 which, in turn, is connected to the lower elongated tool plate 34. The tooling 74 is also tied to the upper elongated tool plate 32 by a finger 78 extending therefrom. A link 80 connects the finger 78 to a bell crank 82 which pivots on a fulcrum 84 mounted to the support plate 76. The opposite end of the bell crank 82 may be tied to a conventional overtravel device 86. The other end of the overtravel device 86 is connected to a slide 88 which is mounted to the support plate 76. Finally, a cartridge member 90 is provided to perform, for example, a pick-and-place operation, i.e., pick up a part from a hopper (not shown) and place it on the pallet 22. The cartridge member 90 is slidably mounted to the support plate 76 and includes a clamp 92 which connects the cartridge member 90 to the slide 88 so that the lateral movement of the slide 88 in one direction and then the other will cause the cartridge member 90 to move inward and outward laterally.

The two elongated tool plates 32 and 34 of the in-line assembly machine 10 renders unnecessary the conventionally-used upper camshaft with separate cams for each work station. Moreover, the tooling used with this machine is interchangeable with tooling used with double tool plate rotary assembly machines. These advantages will become fully apparent in the following description of the operation of the assembly machine 10.

The motor 12 provides power to the indexing drive unit 16 via the reduction gears 14. The indexing drive unit 16 and its drive shaft 18 intermittently index the linked drive belt 20 and the pallets 22 carried thereby. The pallets 22 receive parts to be assembled from parts hoppers (not shown), and move the article being assembled from one work station to the next, progressively adding parts.

The motor 12 also drives the camshaft 24 which is continuously rotated, unaffected by the indexing drive unit 16. The upper and lower elongated tool plates 32 and 34 are reciprocated by the camshaft 24 through their respective following means, the operation of which will be separately described.

The distal cams 30a and 30d and their grooves 36a and 36d control the degree and timing of reciprocation of the lower elongated tool plate 34. As these cams 30a and 30d rotate, the followers 38a and 38d ride up and down in the eccentric lateral groove 36a and 36d of each cam. The followers 38a and 38d are prevented from being laterally displaced with the rotation of the cams 30a and 30d by the tie bars 42a and 42d and the upper tool plate lifting rods 44a and 44d mounted thereto. The upper tool plate lifting rods 44a and 44d reciprocate with the followers 38a and 38d in bushings 54a, 54d, 56a and 56d.

Since the configuration of cam grooves 36a and 36d are identical, the lower elongated tool plate 34 will remain horizontal at all times in the cycle. The lowermost position of the lower elongated tool plate 34 is shown by solid lines in FIG. 3 while the uppermost position is shown in broken lines.

The upper elongated tool plate 32 is driven in a similar fashion. The medial cams 30b and 30c and their grooves 36b and 36c control the reciprocation of the upper elongated tool plate 32. As cams 30b and 30c rotate, the followers 38b and 38c and the upper tool plate lifting rods 44b and 44c connected thereto reciprocate due to the eccentric configuration of the cam grooves 36b and 36c. The followers 38b and 38c are prevented from being laterally displaced with the rotation of the cams 30b and 30c by the tie bars 42b and 42c and the upper tool plate lifting rods 44b and 44c. The tie bars 42b and 42c reciprocate on stationary guide pins 58b and 58c, while the upper tool plate lifting rods reciprocate in bushings 62b, 62c, 64b and 64c.

As with the lower elongated tool plate 34, the upper elongated tool plate 32 will remain horizontal at all times because of the identical configuration of the cam grooves 36b and 36c. The upper elongated tool plate 32 is shown in FIG. 3 in its lowermost position in solid lines, and in its uppermost position in broken lines.

Since there is normally a substantial difference in the configuration of cam grooves 36a and 36d compared to cam grooves 36b and 36c, the two elongated tool plates 32 and 34 reciprocate with respect to each other. This results in the actuation of the tooling 74 located at the various work stations around the machine.

A typical tool actuation operation will now be described. Reference should be made to FIG. 2 which depicts the elongated tool plates 32 and 34 in their lowermost positions. As the camshaft 24 rotates, both elongated tool plates move upward, initially at the same rate but then with the lower elongated tool plate 34 moving upward at a faster rate than the upper elongated tool plate 32. During the initial period of ascent at the same rate, the cartridge member 90 is merely elevated from the pallet 22 and the article (not shown) which has been placed on the pallet 22. At the same time this is happening, the indexing drive unit 16 and the drive belt 20 begin to index the pallets 22, thereby bringing another pallet into position below the cartridge member 90.

When the lower elongated tool plate 34 begins to accelerate upward with respect to the upper elongated tool plate 32, the bell crank 82, via the finger 78 and the link 80, begins to shift slightly in a counter-clockwise direction, thereby moving the slide 88 and the cartridge member 90 to the right or outward toward the hopper (not shown).

As the cartridge member 90 approaches its outermost position, both elongated tool plates 32 and 34 begin to descend, with the upper elongated tool plate 32 descending at a slightly faster rate so that the cartridge member 90 continues to move outward. This causes the cartridge member 90 to approach the article being fed from the hopper (not shown). Since final descent to the article is normally vertical, the upper and lower elongated tool plates 32 and 34 should be moving downward at the same rate to pick up the article.

Once the article is picked up, the upper and lower elongated tool plates 32 and 34 begin to ascend at the same rate. After this initial period of ascent, the upper elongated tool plate 32 begins to accelerate with respect to the lower elongated tool plate 34, thereby shifting the bell crank 82 in a clockwise direction. This causes the cartridge member 90 to move to the left or inward toward the machine 10.

As the cartridge member approaches its innermost position, both the upper and lower elongated tool plates 32 and 34 begin to descend with the lower elongated tool plate 34 descending at a slightly faster rate so that the cartridge member 90 continues to move inward.

This causes the cartridge member 90 and the article (not shown) carried thereby to approach the pallet 22. The final descent to the pallet 22 is normally vertical, so the upper and lower elongated tool plates 32 and 34 normally move downward at the same rate to place the article on the pallet 22. Once the article is placed on the pallet 22, the elongated tool plates 32 and 34 and the cartridge member 90 begin to ascend and a new cycle is started.

Of course, it should be understood that various changes and modifications in the preferred embodiments described herein will be apparent to those skilled in the art. Such changes and modifications can be made without departing from the spirit and scope of the present invention and without diminishing its attendant advantages. It is therefore intended that such changes and modifications be covered by the following claims.

We claim:

1. An in-line assembly machine having a plurality of work stations, at least three of which are arranged in the same straight line, comprising:
   a camshaft oriented along an axis;
   two sets of cams fixed to said camshaft;
   an upper elongated tool plate oriented parallel to said camshaft axis;
   a lower elongated tool plate oriented parallel to said camshaft axis, said upper and lower tool plates each being mounted to move reciprocally with respect to one another to commonly actuate tooling associated with the machine at a plurality of work stations;
   a first set of lifting rods mounted to reciprocate said upper elongated tool plate;
   a second set of lifting rods mounted to reciprocate said lower elongated tool plate;
   a first set of cam followers mounted to said first set of lifting rods and mounted to follow one set of said cams;
   a second set of cam followers mounted to said second set of lifting rods and mounted to follow the other set of said cams, each of said sets of followers cooperating with a respective set of said cams to translate the rotational motion of said cams into reciprocation of said lifting rods, so that rotation of said camshaft causes said upper and lower elongated tool plates to reciprocate, thereby providing the common actuation desirable to perform operations on parts to be assembled.

2. The assembly machine of claim 1 wherein said upper and lower elongated tool plates are of sufficient length to actuate all of the tooling associated with the machine, thereby eliminating the necessity of separate cams for the tooling at each work station.

3. The assembly machine of claim 1 wherein each said elongated tool plate is reciprocated by at least two axially-spaced cams, with at least one lifting rod for each said cam.

4. The assembly machine of claim 1 wherein said camshaft and said upper and lower elongated tool plates are substantially horizontal, and said first and second lifting rods are substantially vertical.

5. In an in-line assembly machine having a plurality of work stations, at least three of which are arranged in the same straight line, each of said stations including tooling for performing operations on parts to be assembled, a camshaft, means for rotating said camshaft at a regular rate, a plurality of axially-spaced cams fixed to said camshaft, following means extending between said cams and the tooling, said following means being mounted to translate the rotation of said cams into movement of the tooling, thereby performing operations on the parts to be assembled, the improvement comprising:
   an upper elongated tool plate;
   a lower elongated tool plate, said upper and lower elongated tool plates each being mounted for relative reciprocal movement in regular paths to actuate the tooling at a plurality of work stations with the same two moveable tool plates to perform operations on the parts to be assembled;
   and wherein said following means include first lifting means mounted to operate said upper elongated tool plate and to follow one of said cams, second lifting means mounted to operate said lower elongated tool plate and to follow another of said cams so that the rotation of said camshaft causes said upper and lower elongated tool plates to move in a regular path and thereby perform operations on the parts to be assembled.

6. An in-line assembly machine comprising:
   horizontally moveable pallet means for carrying articles to be assembled;
   a camshaft oriented along a horizontal axis;
   two sets of cams fixed to said camshaft;
   an upper elongated tool plate oriented along a horizontal axis;
   a lower elongated tool plate oriented along a horizontal axis, said upper and lower tool plates being mounted for vertical reciprocal movement with respect to said pallet means and each other to actuate tooling associated with the machine at a plurality of work stations with the same two moveable tool plates, thereby eliminating the necessity of a second camshaft with separate cams for the tooling at each work station;
   a first set of lifting rods mounted to reciprocate said upper elongated tool plate;
   a second set of lifting rods mounted to reciprocate said lower elongated tool plate;
   a first set of cam followers mounted to said first set of lifting rods and mounted to follow one set of said cams;
   a second set of cam followers mounted to said second set of lifting rods and mounted to follow another set of said cams, each of said sets of followers cooperating with a respective set of said cams to translate the rotational motion of said cams into reciprocation of said lifting rods, so that rotation of said camshaft causes said upper and lower elongated tool plates to reciprocate, thereby providing the common actuation desirable to perform operations on the articles to be assembled which are being carried by said pallet means.

7. An in-line assembly machine comprising:
   horizontally moveable pallet means for carrying articles to be assembled;
   a camshaft oriented along a horizontal axis;
   two sets of cams fixed to said camshaft;
   an upper elongated tool plate oriented along a horizontal axis;
   a lower elongated tool plate oriented along a horizontal axis, said upper and lower tool plates being mounted for vertical reciprocal movement with respect to said pallet means and each other;
   a first set of lifting rods mounted to reciprocate said upper elongated tool plate;

a second set of lifting rods mounted to reciprocate said lower elongated tool plate;

a first set of cam followers mounted to said second set of lifting rods and mounted to follow one of said cams;

a second set of cam followers mounted to said second set of lifting rods and mounted to follow another set of said cams, each of said sets of followers cooperating with a respective set of said cams to translate the rotational motion of said cams into reciprocation of said lifting rods, so that rotation of said camshaft causes said upper and lower elongated tool plates to reciprocate; and pick-and-place tooling means connected solely to both said upper elongated tool plate and said lower elongated tool plate so that reciprocation of said upper and lower elongated tool plates actuates said pick-and-place tooling means.

8. The in-line assembly machine of claim 7 wherein said pick-and-place tooling means includes slide means attached to said lower elongated tool plate and a bell crank for moving said slide means, said bell crank being pivotally mounted on said lower elongated tool plate and said bell crank being connected to said upper elongated tool plate so that reciprocation of said upper elongated tool plate moves said bell crank and relative reciprocal motion of said upper and lower elongated tool plates actuates said pick-and-place tooling means.

9. In an in-line assembly machine having a plurality of work stations, at least three of which are arranged in the same straight line, each of said stations including tooling for performing operations on parts to be assembled; a camshaft; means for rotating said camshaft at a regular rate; a plurality of axially-spaced cams fixed to said camshaft; following means extending between said cams and the tooling, said following means being mounted to translate rotation of said cams into movement of the tooling; the improvement comprising:

an elongated moveable means for actuating tooling;

an elongated moveable means for supporting tooling, said tooling actuating means and said tooling support means being mounted for relative reciprocal movement in regular paths to actuate the tooling at a plurality of work stations with the same two elongated moveable means to perform operations on the parts to be assembled; and wherein said following means include first lifting means mounted to operate said tooling actuating means and to follow one of said cams, and second lifting means mounted to operate said tooling support means and to follow another of said cams so that the rotation of said camshaft causes said tooling actuating means and said tooling support means to move said tooling to perform operations on parts to be assembled.

10. The in-line assembly machine of claim 9 wherein said elongated tooling actuating means is oriented along a horizontal axis.

11. The in-line assembly machine of claim 9 wherein said elongated tooling support means is oriented along a horizontal axis.

* * * * *

UNITED STATES PATENT AND TRADEMARK OFFICE
CERTIFICATE OF CORRECTION

PATENT NO. : 4,292,734

DATED : October 6, 1981

INVENTOR(S) : Douglas L. Swanson and Norman H. Yeo

It is certified that error appears in the above—identified patent and that said Letters Patent is hereby corrected as shown below:

Column 1, line 54, delete "ordinarly" and substitute therefor --ordinarily--;

Column 3, line 42, delete "gear" and substitute therefor --gears--;

Column 6, line 25, delete "tool" and substitute therefor --tooling--;

Column 7, line 11, delete "embodients" and substitute therefor --embodiments--.

Signed and Sealed this

Eighteenth Day of May 1982

[SEAL]

Attest:

*Attesting Officer*

GERALD J. MOSSINGHOFF

*Commissioner of Patents and Trademarks*